United States Patent
Demarest et al.

(10) Patent No.: US 10,806,553 B2
(45) Date of Patent: Oct. 20, 2020

(54) ORAL CARE MOUTHPIECE

(71) Applicant: Colgate-Palmolive Company, New York, NY (US)

(72) Inventors: Scott Demarest, Basking Ridge, NJ (US); Mahmoud Hassan, Somerset, NJ (US); Jo Fleming, San Diego, CA (US); David Neese, San Diego, CA (US); Michael Gordon, San Diego, CA (US); David Berardelli, San Diego, CA (US); Andrew Valentine, San Diego, CA (US)

(73) Assignee: Colgate-Palmolive Company, New York, NY (US)

( * ) Notice: Subject to any disclaimer, the term of this patent is extended or adjusted under 35 U.S.C. 154(b) by 162 days.

(21) Appl. No.: 15/765,502

(22) PCT Filed: Oct. 5, 2015

(86) PCT No.: PCT/US2015/053960
§ 371 (c)(1),
(2) Date: Apr. 3, 2018

(87) PCT Pub. No.: WO2017/061980
PCT Pub. Date: Apr. 13, 2017

(65) Prior Publication Data
US 2019/0069982 A1 Mar. 7, 2019

(51) Int. Cl.
*A61C 19/06* (2006.01)

(52) U.S. Cl.
CPC .......... *A61C 19/066* (2013.01); *A61C 19/063* (2013.01)

(58) Field of Classification Search
CPC ..... A61C 19/00; A61C 19/066; A61C 19/063; A61C 7/08
See application file for complete search history.

(56) References Cited

U.S. PATENT DOCUMENTS

| | | | |
|---|---|---|---|
| 5,741,500 A * | 4/1998 | Yates | A61K 9/006 424/402 |
| 5,842,860 A * | 12/1998 | Funt | A61J 7/0092 433/80 |
| 5,846,048 A | 12/1998 | Tomita et al. | |
| 5,891,453 A | 4/1999 | Sagel et al. | |

(Continued)

FOREIGN PATENT DOCUMENTS

| | | |
|---|---|---|
| CN | 104869944 | 8/2015 |
| WO | 2002/071968 | 9/2002 |

(Continued)

OTHER PUBLICATIONS

International Search Report and Written Opinion of the International Searching Authority in International Application No. PCT/US2015/053960, dated Aug. 17, 2016.

*Primary Examiner* — Heidi M Eide

(57) ABSTRACT

An oral care mouthpiece (10) is disclosed. The mouthpiece includes a shell (15) having an arch shape corresponding to a dental arch. The shell (15) includes a wall corresponding to facial surfaces of teeth in the dental arch, and a bite plate corresponding (157) to biting surfaces of the teeth. The mouthpiece also includes a wicking layer (19) on an inner surface of the wall. The mouthpiece further includes a filament layer (23) on the wicking layer.

15 Claims, 6 Drawing Sheets

(56) References Cited

U.S. PATENT DOCUMENTS

| | | | |
|---|---|---|---|
| 6,068,475 A * | 5/2000 | Stoyka, Jr. | A61C 19/063 128/861 |
| 6,274,122 B1 | 8/2001 | McLaughlin | |
| 6,506,053 B2 | 1/2003 | Wiesel | |
| 6,616,447 B1 | 9/2003 | Rizoiu et al. | |
| 6,840,771 B1 | 1/2005 | Wagner | |
| 7,114,953 B1 * | 10/2006 | Wagner | A61C 19/063 433/214 |
| 7,128,899 B2 | 10/2006 | Chen | |
| 7,137,814 B2 | 11/2006 | Fischer et al. | |
| 8,262,390 B1 | 9/2012 | Levine | |
| 8,747,113 B2 | 6/2014 | Brown et al. | |
| 8,784,106 B1 | 7/2014 | Wagner | |
| 8,956,160 B2 | 2/2015 | Willison et al. | |
| 2003/0003421 A1 | 1/2003 | Bestenheider et al. | |
| 2004/0131561 A1 * | 7/2004 | McLaughlin | A61C 19/063 424/53 |
| 2005/0255054 A1 | 11/2005 | Philp, Jr. et al. | |
| 2005/0260544 A1 | 11/2005 | Jones et al. | |
| 2006/0099550 A1 * | 5/2006 | Faasse | A61C 19/063 433/215 |
| 2009/0017422 A1 * | 1/2009 | Creamer | A61C 19/066 433/215 |

FOREIGN PATENT DOCUMENTS

| | | | |
|---|---|---|---|
| WO | WO-2014138659 A2 * | 9/2014 | A61C 19/066 |
| WO | 2015/020293 | 2/2015 | |

* cited by examiner

ORAL CARE MOUTHPIECE

BACKGROUND

Various at-home oral care systems are available to consumers. One such system uses a plastic tray that contains a liquid bleaching agent dispensed by the consumer into the tray. In another approach, the consumer paints a bleaching agent directly on their teeth. Yet another system incorporates the bleaching agent in a strip that sticks to the teeth. However, each of these systems has disadvantages. For example, bleaching strips may only contact the teeth on their facial surfaces and, therefore, do a poor job of bleaching interproximal surfaces. Also, bleaching strips can cause discomfort when they slip off the teeth. Further, the effectiveness of the bleaching agent in whitening strips is greatly reduced when diluted by saliva. Moreover, bleaching agents may drip off of teeth, or overflow or spill out of a tray, into the consumer's mouth and out of contact with the consumer's teeth.

BRIEF SUMMARY

Embodiments of the present disclosure provide an oral care mouthpiece. The mouthpiece includes a shell having an arch shape corresponding to a dental arch. The shell includes a wall corresponding to facial surfaces of teeth in the dental arch, and a bite plate corresponding to biting surfaces of the teeth. The mouthpiece also includes a wicking layer on an inner surface of the wall. The mouthpiece further includes a filament layer on the wicking layer.

Embodiments of the present disclosure also provide an oral care mouthpiece. The mouthpiece includes a shell having an arch shape corresponding to a dental arch. The shell includes a wall corresponding to facial surfaces of teeth in the dental arch, a bite plate corresponding to biting surfaces of the teeth, a reservoir of liquid below the bite plate, and a frangible seal containing the liquid in the reservoir. The mouthpiece also includes a wicking layer on an inner surface of the wall. The mouthpiece further includes a filament layer on the wicking layer.

Embodiments of the present disclosure further provide a method for forming an oral care mouthpiece. The method includes forming a shell comprising a wall corresponding to facial surfaces of teeth in a dental arch, and a bite plate corresponding to biting surfaces of the teeth. The method further includes forming a wicking layer. Additionally, the method includes forming a filament layer. Further, the methods include attaching the wicking layer and the filament layer to an inner surface of the wall, wherein the wicking layer is sandwiched between the inner surface and the filament layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
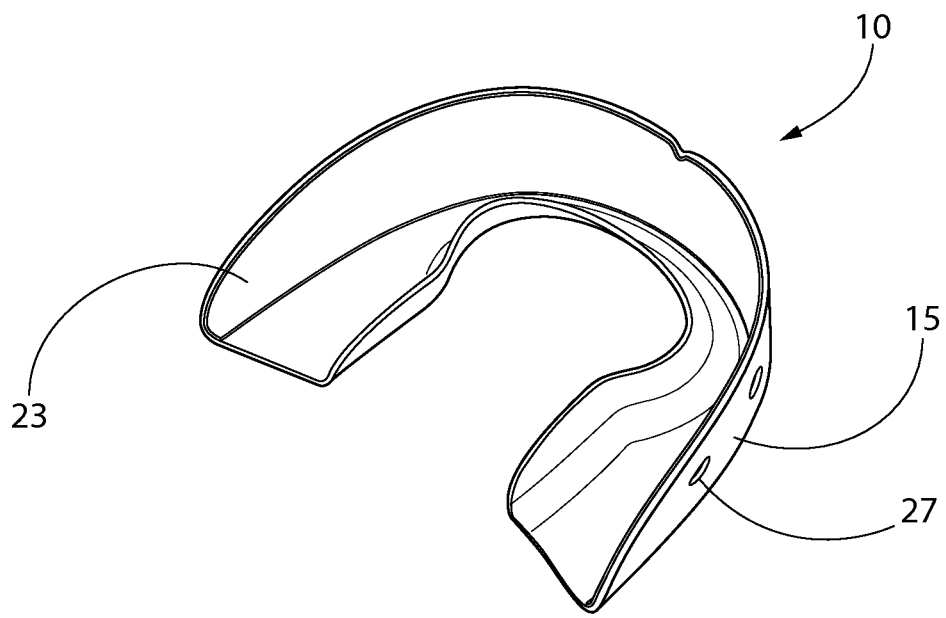
FIG. 1 illustrates a top, rear perspective view of an exemplary oral care mouthpiece in accordance with aspects of the present disclosure.

The following description of the preferred embodiments is merely exemplary in nature and is in no way intended to limit the invention, its application, or its uses.

The present invention is directed to oral care systems, and more specifically to an oral care mouthpiece. In accordance with aspects of the present disclosure, the mouthpiece includes a filament layer (e.g., a whitening layer or a desensitization layer or a malodor control layer or a plaque, gingivitis or cavity reduction layer, etc.) comprised of chemical components for, e.g., whitening or desensitizing teeth. In embodiments, the chemical components may be incompatible or unsuitable for storage when combined in a wet state and can be kept in a dry, inactive state until they are mixed and activated by moisture. For example, before placing the mouthpiece in a user's mouth, the user can activate the chemical components of the filament layer by holding the mouthpiece under a running faucet. Additionally or alternatively, after placing the mouthpiece in his/her mouth, the user's saliva can activate the chemical components. Additionally or alternatively in various embodiments, the mouthpiece can include a reservoir of fluid that is released by the user biting down on the mouthpiece after it is placed in the user's mouth. The fluid in the reservoir can also be released by squeezing the reservoir with fingers before inserting the mouthpiece in his/her mouth.

The mouthpiece is adapted to fit upon one or both dental arches of a user. In embodiments, the mouthpiece has a shape customized (e.g., fabricated and/or modified) to correspond to a particular user's dental arches and/or tooth contours. Additionally, in embodiments, the mouthpiece can include an upper section that is separate from a lower section. The upper section can have a shape corresponding to a user's upper dental arch and/or dental contours, and the lower section can have a shape corresponding to the user's lower dental arch and/or dental contours. The upper section and lower section can be entirely, physically separate pieces or they can be integral pieces.

In accordance with aspects of the present disclosure and certain embodiments, each section of the mouthpiece includes three layers: a shell, a wicking layer, and a filament layer. The wicking layer and filament layer may cover all or a portion of the interior surface of the shell, wherein the filament layer is positioned to be directly aligned and adjacent to a user's teeth, and the wicking layer is sandwiched between the shell and the filament layer.

The shell can be made of a malleable material that is conformable to the teeth (e.g. soft plastic, wax, or the like). In embodiments, the shell is substantially unmalleable at room temperature (e.g., about 68 deg. to about 78 deg. Fahrenheit) and softens at body temperature (e.g., greater than about 96 deg. Fahrenheit) of the user such that the shell can be deformed (e.g., under pressure from the user's fingers, lips, and/or inner cheeks) to conform to the contours of the teeth of the user. For example, the shell may be a wax-like material that becomes malleable while in the user's mouth and can be squeezed to place the filament layer in direct contact with the facial surfaces and the interproximal surfaces of the user's teeth. Additionally, in some embodiments, materials for the shell layer that can be physically manipulated by the user with their fingers to conform to the teeth topography without heating. Further, in some embodiments, the material of the shell can be comprised of resins that shrink when in the oral cavity such that they conform tightly to the curvature of the teeth. By conforming the mouthpiece to the teeth, embodiments disclosed herein provide a close relationship of the oral care material (e.g., for whitening, for sensitivity treatment, for reducing bad breath, plaque, gingivitis or cavities, etc.) to the teeth and also helps retain the mouthpiece to the teeth during treatment.

In embodiments, the shell includes thru-holes (e.g., vias, ducts, channels, cut-outs, holes, or tubes) that fluidly connect the wicking layer to the environment outside of the shell. For example, the thru-holes allow ingress of fluid (e.g., by absorbing saliva from a user's mouth) into the wicking layer through the shell. The fluid is collected and/or held by the wicking layer, which transfers moisture to activate the filament layer. For example, fluid held in the wicking layer can hydrate, dissolve, and mix the dry components that comprise the filament layer.

The wicking layer is a substantially, flat layer of highly absorbent material (e.g., fabric, cloth, or paper). In embodiments, the highly absorbent material fitted to the mouthpiece can absorb and retain an amount of fluid in a range of about 2 mL to about 7 mL. The wicking layer can be an ultra-thin layer comprised of, for example, cellulose fibers. In embodiments, the ultra-thin layer can have a thickness in a range of about 0.0125 mm to about 2.00 mm. In embodiments, the wicking layer is a non-woven material.

The filament layer is a dry layer including one or more layers of film containing multiple chemistry components. In embodiments, prior to hydration, the multiple chemistry components are inactive. When hydrated, the chemistry components mix and, thereby, are transformed into an oral care agent (e.g., whitening chemistry or desensitization chemistry or malodor control chemistry or plaque, gingivitis or cavity reduction chemistry, etc.), which can be a liquid, a semi-liquid, a gel, or a paste. Thus, the multiple chemistry components can be activated and mixed at the point of use for optimal efficacy.

The filament layer can be a multi-component film, including an activator (e.g., a catalyst) that forms an active oral care agent (e.g., an oxidizer). In some embodiments, the activator facilitates the formation of the oral care agent by combining with at least two other of the components. In some embodiments, the activator facilitates the formation of the oral care agent by catalyzing a reaction between at least two of the other components. Further, in some embodiments, the filament layer can be combined (e.g., integrated with or impregnated into) with the wicking layer into a single layer.

In some embodiments, the mouthpiece does not solely use liquid from an external source (e.g., water from a faucet or saliva from a user's mouth) to hydrate and/or mix the chemical components in the filament layer. Instead, the mouthpiece can be fabricated with one or more compartments that hold reservoirs of a liquid. The liquid can be, for example, water, a chemical gel, or the like. In embodiments, the liquid is a component of the active oral care agent (e.g., a catalyst). In some embodiments, when the consumer inserts the mouthpiece and bites down, the compartment is ruptured at a frangible surface that opens into an interior space of the mouthpiece. In other embodiments, the user ruptures the compartment with their hands before inserting the mouthpiece. After the liquid is forced from the reservoir and into the interior space. The liquid is then absorbed by the wicking layer, which hydrates and mixes the dry components of the filament layer.

In an example of a process using a mouthpiece consistent with some embodiments disclosed herein, the mouthpiece is provided to the user in a moisture resistant package that prevents hydration of the wicking layer or the filament layer. The user removes the mouthpiece from the package and puts one section on the upper arch of teeth. Heat and/or moisture in the mouth of the user soften the mouthpiece such that it deforms from its initial shape into a shape that conforms to the particular curvature and topographic features of that user's teeth. Additionally or alternatively, the user can manually conform the section of the mouthpiece to the curvature and topographic features of the teeth by squeezing the mouthpiece against and/or around the teeth using their hands. The same process is followed with a second section that is fitted to the bottom arch.

Once the mouthpiece is placed in the user's mouth, the user's normal production of saliva is naturally increased. As saliva enters the mouthpiece through the thru-holes in the shell, it is collected (e.g., wicked-up) and held by the wicking layer. Saliva may also enter the mouthpiece over the walls of the shell to directly contact the filament layer. Within a short period of time (e.g., about 30 to about 120 seconds), moisture in the wicking layer hydrates the filament layer, which activates the separate components of the oral care agent (e.g., whitening or desensitization or malodor control or plaque, gingivitis or cavity reduction chemicals, etc.). In embodiments, as moisture is transferred into the filament layer, it transforms into an oral agent, which may be a liquid, a gel, a paste, or the like. The oral care agent is held in direct contact with the facial surfaces and the interproximal surfaces of the user's teeth by the shell and/or the wicking layer.

The oral care treatment process begins to work once the consumer puts the mouthpieces into their mouth. Total treatment time can range from about 5 minutes to about 30 minutes depending on the composition of the filament layer. After use, the mouthpiece can be removed by pulling away from the teeth and disposed of, which promotes good hygiene. Beneficially, methods and devices consistent with the present disclosure position the active chemistry in locations optimal for performance while providing a device that is convenient and intuitive to use because no manual application of chemistry is required. Rather, simply putting the mouthpiece into the mouth is all that is necessary to satisfy users' need for the desired oral care treatment.

Figure 2:
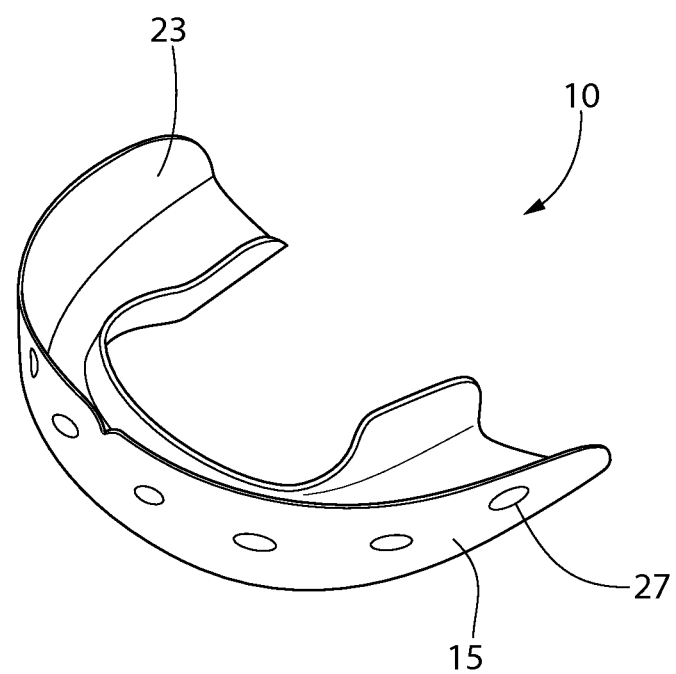
FIG. 2 illustrates a top, front perspective view of an exemplary oral care mouthpiece in accordance with aspects of the present disclosure.
Figure 3:
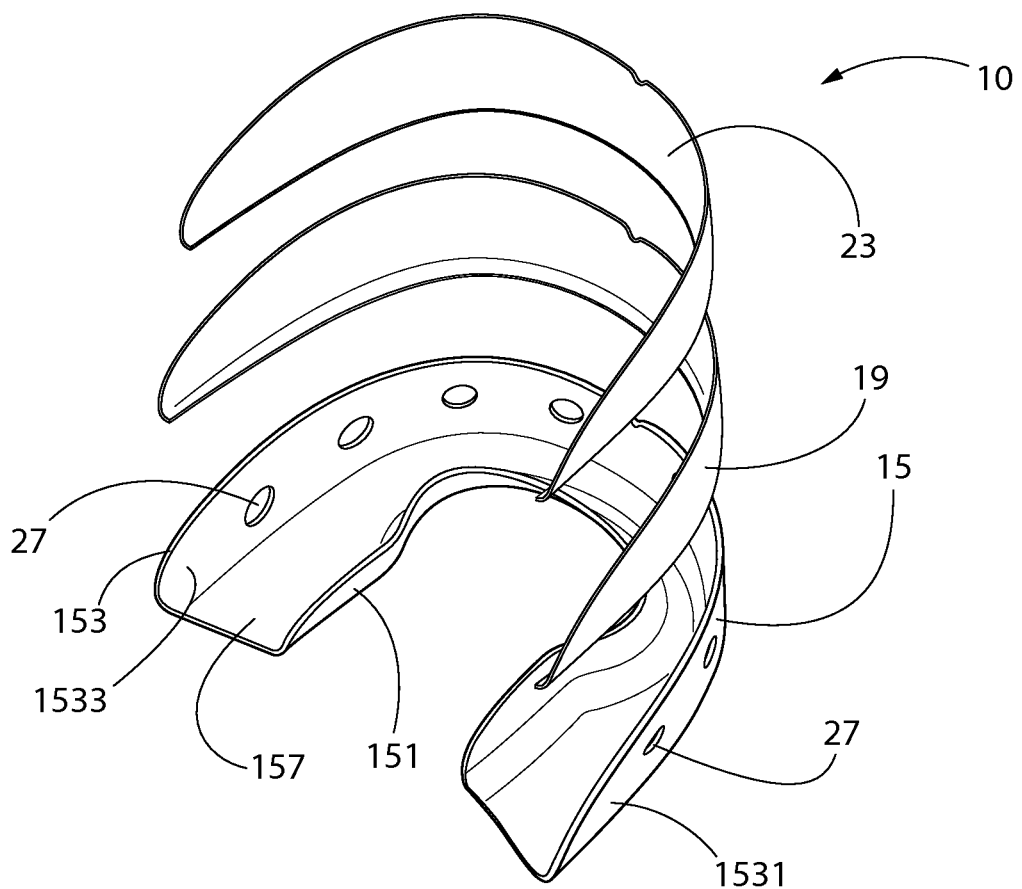
FIG. 3 illustrates a top, rear, exploded perspective view of an exemplary oral care mouthpiece in accordance with aspects of the present disclosure.
Figure 4:
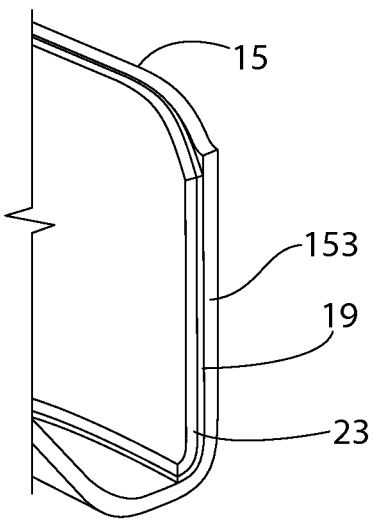
FIG. 4 illustrates a cross sectional view of an exemplary oral care mouthpiece in accordance with aspects of the present disclosure.

FIGS. 1-4 illustrate an exemplary oral care mouthpiece 10 in accordance with aspects of the present disclosure. FIG. 1 illustrates a top, rear perspective view of the exemplary oral care mouthpiece 10. FIG. 2 illustrates a top, front perspective view of the exemplary oral care mouthpiece 10. FIG. 3 illustrates a top, rear, exploded perspective view of the exemplary oral care mouthpiece 10. And, FIG. 4 illustrates a cross sectional view of the exemplary mouthpiece. The oral care mouthpiece 10 includes a shell 15, a wicking layer 19, a filament layer 23, and thru-holes 27, which can be the same or similar to those previously described herein. The shell 15 has an arch shape adapted to fit on one or more dental arches (i.e., an upper arch and/or a lower arch) of a user (e.g., a consumer). The shell 15 includes a wall having a surface that faces the user's teeth when the oral care mouthpiece 10 is positioned in a user's mouth such that the filament layer 23 aligns with and contacts the user's visible teeth (e.g., incisors, canines, and/or pre-molars). In embodiments, the shell 15 is fabricated to conform to the surfaces and contours of teeth of a particular user. Additionally, as detailed previously herein, the shell 15 can be comprised of a malleable material (e.g., wax) that deforms after being placed in the user's mouth (e.g., aided by body heat, pressure, and or shrinkage) to conform to the surfaces and contours of the user's teeth.

Referring to exploded view of FIG. 3, in embodiments, the shell 15 comprises at least three portions, including an inner wall 151, an outer wall 153, and a bite plate 157. The inner wall 151 can be substantially perpendicular to the bite plate 157 and provide a barrier with the user's pallet and/or tongue such that the inner wall 151 retains the oral care chemistry in the oral care mouthpiece 10 when the filament layer 23 liquefies.

In embodiments, the outer wall 153 of the shell 15 can be substantially perpendicular to the bite plate 157. The outer wall 153 includes an outermost surface 1531 and an innermost surface 1533. The outermost surface 1531 directly contacts the interior skin of the mouth (e.g., interior surfaces of the cheeks and lips). The innermost surface 1533 of the outer wall 153 faces the user's teeth and supports the wicking layer 19 and the filament layer 23. As discussed previously herein, the oral care mouthpiece 10 can be malleable such that the innermost surface 1553 can be shaped and/or deformed to correspond to the contours of the user's teeth, such that the outer wall 153 positions and presses the filament layer 23 directly against or otherwise substantially contacts the facial and interproximal surfaces of the user's teeth. Additionally, the innermost surface 1533 of the outer wall 153 can be in contact with the wicking layer 19 and can have a perimeter shape that is substantially contiguous with the wicking layer 19. In embodiments, the innermost surface 1533 of the outer wall 153 directly contacts the wicking layer 19 such that the thru-holes 27 are in direct fluid connection with the wicking layer 19.

In embodiments, two or more thru-holes 27 extend entirely through the outer wall 153, including the outermost surface 1531 and the innermost surface 1533. The shape of the perforations can range from diameters to ovals to slots. The thru-holes 27 can be spaced substantially equidistantly along a horizontal midline of the outer wall 153 and/or can have a diameter of about 2 mm to about 6 mm, to allow fluid to pass through the outer wall 153 and be absorbed by the wicking layer 19. In other embodiments, the outer wall 153 includes 2 to 10 perforations distributed in two-dimensional array along the entire face of the outer wall 153 and having a diameter of about 3 sq.-mm to about 110 sq.-mm, which allow fluid to pass through the outer wall 153 and be wicked into the wicking layer 19.

The bite plate 157 is a surface of the shell 15 that is substantially perpendicular to the inner wall 151 and the outer wall 153. The bite plate 157 can be sized and shaped to correspond to the shapes of the different the biting surfaces of the user's teeth. For example, the bite plate 157 can have narrow portions corresponding to width of the incisors, and broader portions corresponding to the user's premolars and/or molars. In embodiments, the bite plate 157 flares at the ends of the arch-shape to provide a flat biting surface substantially corresponding to the size and location of the premolars and/or the molars, which allows the user to securely hold the oral care mouthpiece 10 when in use.

Referring to FIGS. 1-3, the filament layer 23 is positioned on the shell 15 to aligns with the teeth of the user, such that it directly contacts the teeth of the user when install in the user's mouth. In embodiments, the filament layer 23 can cover substantially the entire innermost surface 1533 of the outer wall 153 such that it directly contacts at least the facial surfaces of the user's visible teeth. In some embodiments, the filament layer 23 covers only a portion of the innermost surface 1533 of the outer wall 153 corresponding to the positions of some or all of the user's visible teeth. Referring to sectional view of FIG. 4, the wicking layer 19 is sandwiched between the innermost surface 1533 of the outer wall 153 of the shell 15 and the filament layer 23. The size and shape of the wicking layer 19 can be contiguous with the filament layer 23. In embodiments, the wicking layer 19 and the filament layer 23 are aligned such that they are in direct contact over the entirety of the innermost surface 1533 and share an entirely contiguous perimeter. In embodiments, the wicking layer 19 and the filament layer 23 extends horizontally over the bite plate 157. Further, in some embodiments, the filament layer 23 and the wicking layer 19 can be integrated in a single layer. For example, chemistry components of the filament layer 23 can be coated onto the wicking layer 19 or impregnated into the wicking layer 19.

Figure 5:
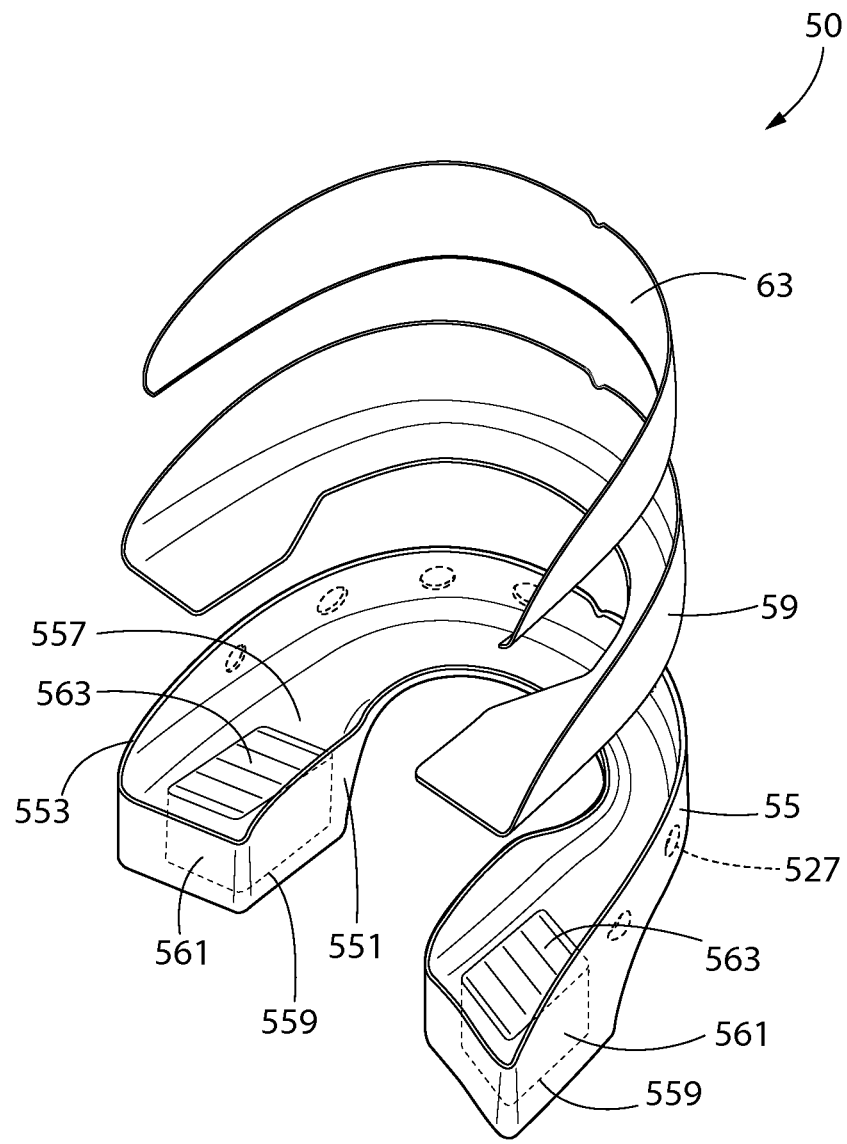
FIG. 5 illustrates a top, rear, exploded perspective view of another exemplary oral care mouthpiece in accordance with aspects of the present disclosure.

FIG. 5 shows a top, rear, exploded perspective view of a mouthpiece 50 in accordance with aspects of the present disclosure. Referring to FIG. 5, the mouthpiece 50 includes a shell 55, a wicking layer 59, and a filament layer 63, which can be the same or similar to those previously discussed herein. The shell 55 includes an inner wall 551, an outer wall 553, and a bite plate 557, which can also be the same or similar to those previously discussed herein. Further, in some embodiments, the shell 55 can include thru-holes 527, which can also be the same or similar to those previously discussed herein.

Additionally, in accordance with aspects and some embodiments of the present disclosure, the shell 55 includes two or more compartments 559 containing a liquid 561 that is contained by and physically isolated from the interior region of the mouthpiece 50 (e.g., a region bounded by the inner wall 551, the outer wall 553, and the bite plate 557) by respective frangible seals 563. The compartments 559 are water-tight volumes in the body of the shell 15 at and/or below the bite plate 557 that contain the liquid 561. The liquid 561 may be water or a composition that includes one or more chemicals or components that combine, mix, hydrate, or otherwise interact with chemicals or components in the oral care layer 63 to form a desired oral care composition. In embodiments, the compartments 559 each contain about 2 milliliters to about 7 milliliters of the liquid 561.

In embodiments, each of the frangible seals 563 can be a layer or film of gelatin, polymer, or cellulose that contains the liquid 561 within the compartments 559 and provides a water-tight barrier between the liquid 561 and interior region of the mouthpiece 50, which prevents unintended hydration of the wicking layer 19 and filament layer 23. The frangible seals 563 can be substantially planar and contiguous with an uppermost surface of the bite plate 557. In other embodiments, the frangible seals 563 can entirely encapsulate the liquid 561. For example, the frangible seals 563 can form capsules around the liquid 561 that can be installed within the compartments 559.

In some embodiments, the user can manually rupture the compartments with their fingers prior to inserting the mouthpiece in their mouth, which releases the liquid 561 into the interior region of the shell 55. In other embodiments, the compartments 559 (including the liquid 561) are disposed at positions corresponding to the user's molars and/or premolars. As such, when a user inserts the mouthpiece 55 and bites down on the bite plate 557, the frangible seals 563 are ruptured. Under pressure from the user's bite collapsing the rupturable compartment 559, the liquid 561 is forced into the interior region of the shell 55, such that the liquid 561 comes into contact with the wicking layer 59. In embodiments, as shown in FIG. 5, the wicking layer 59 can extend onto the surface of the bite plate 557 such that it is in direct contact with the liquid 561 after the frangible seals 563 rupture and the liquid 561 exits the compartments 559. Thus, the liquid 561 in the cavity 564 can be absorbed into the entire area of the wicking layer 59, which hydrates the filament layer 63, as previously discussed herein. Thus, in various embodiments, due to immediate provision of liquid 561 to the wicking layer 59 from the compartment 559, the mouthpiece 50 can activate the components of the filament layer 63 quickly (e.g., from 30 to 120 seconds). Additionally, in some embodiments, liquid (e.g., saliva) can pass through thru-holes 527 and be absorbed by the wicking layer 59, which contributes to the hydration of the filament layer 63.

Figure 6:
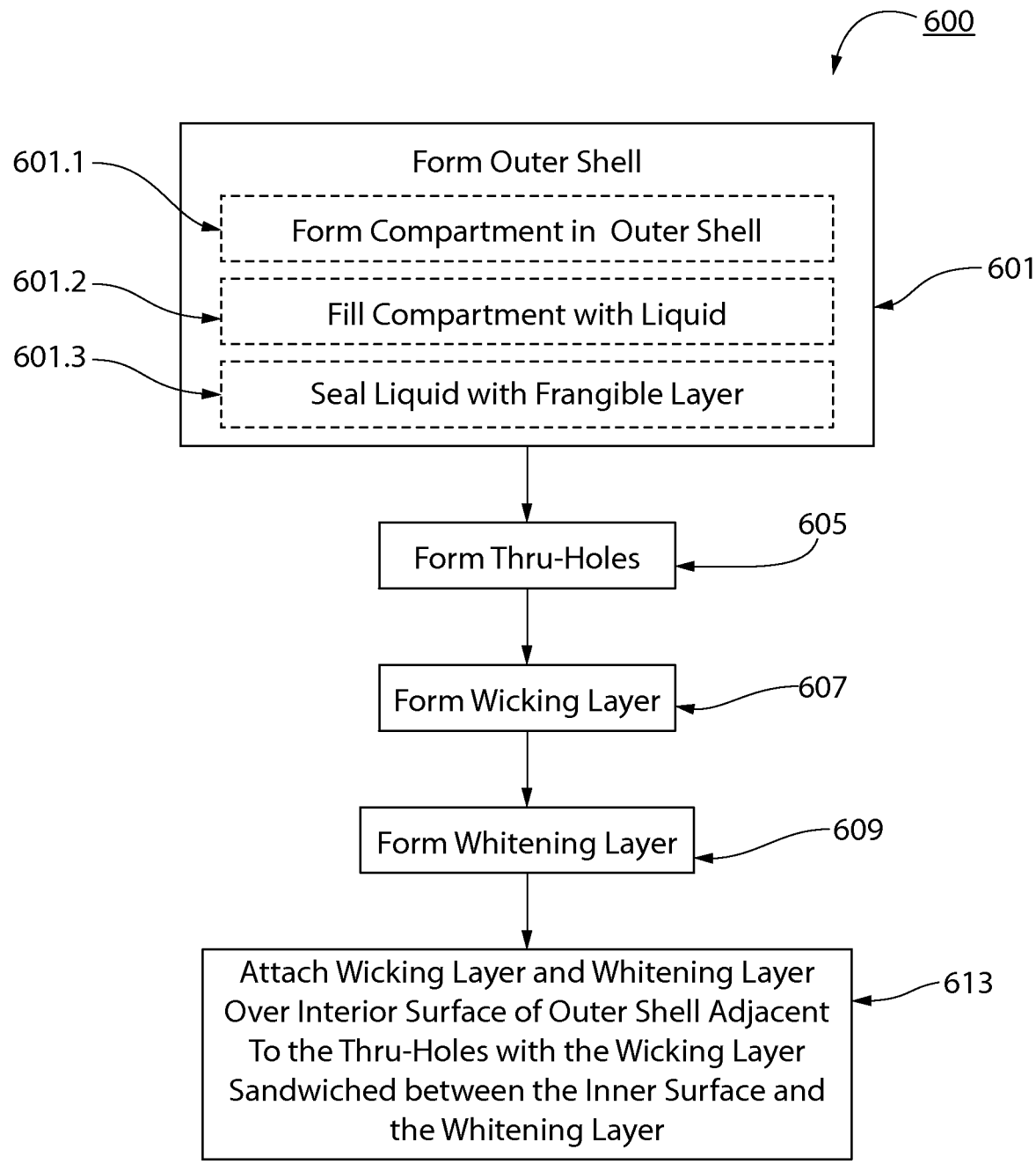
FIG. 6 illustrates a flow diagram of an exemplary process for fabricating an oral care mouthpiece in accordance with aspects of the present disclosure.
Figure 7:
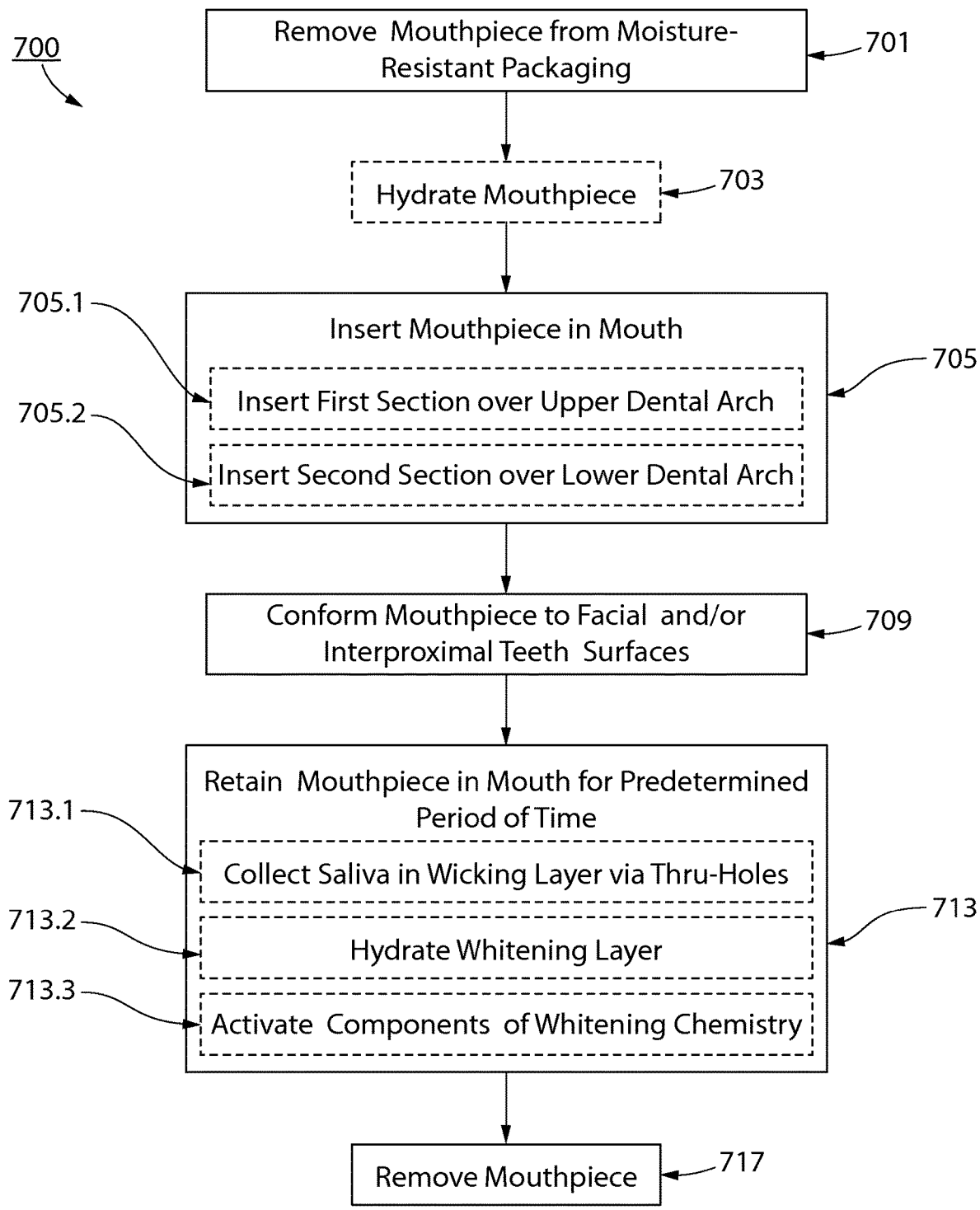
FIG. 7 illustrates a flow diagram of an exemplary process for using an oral care mouthpiece in accordance with aspects of the present disclosure.
Figure 8:
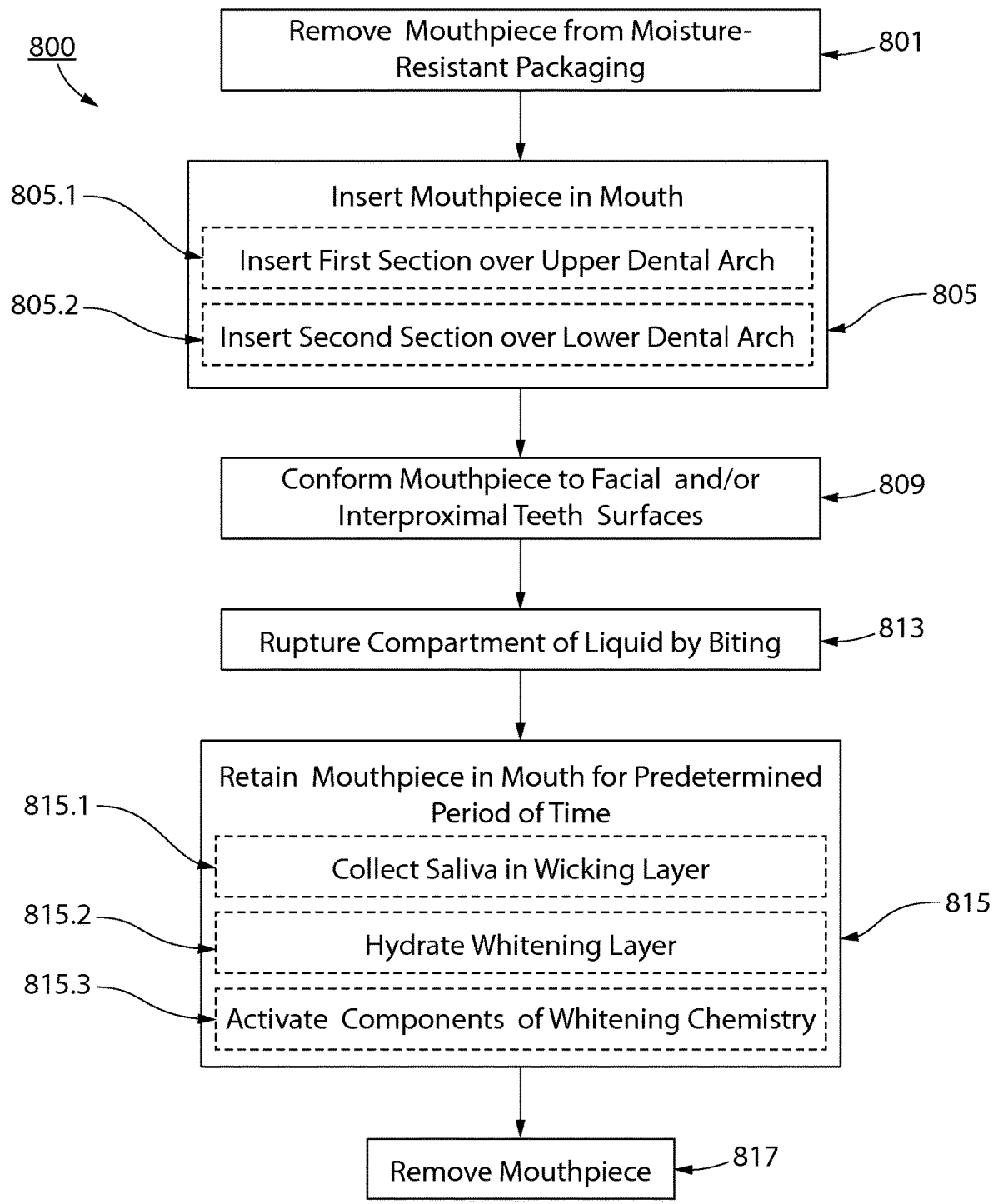
FIG. 8 illustrates a flow diagram of an exemplary process for using an oral care mouthpiece in accordance with aspects of the present disclosure.

The flow diagrams in FIGS. 6-8 illustrate functionality and operation of possible implementations of systems (e.g., manufacturing systems, devices, methods, and computer program products) according to various embodiments of the present disclosure. In some alternative implementations, the functions and/or operations illustrated in a particular block of the flow diagrams can occur out of the order shown in FIGS. 6-8. For example, two blocks shown in succession can be executed substantially concurrently, or the blocks can sometimes be executed in another order (e.g., the reverse order), depending upon the functionality involved. It will also be noted that each block of the flow diagrams and combinations of blocks can be implemented by special purpose hardware-based systems that perform the specified functions or acts, or combinations of special purpose hardware and computer instructions.

FIG. 6 illustrates a flow diagram of a process 600 for fabricating a mouthpiece (e.g., oral care mouthpiece 10 or oral care mouthpiece 50) in accordance with aspects of the present disclosure. At 601, the process 600 forms a shell (e.g. shell 15 or shell 53) of the mouth piece. For example, the shell can be cast in a mold using a wax-like material. In optional embodiments, at 601.1 the process 600 forms a compartment (e.g., compartment 559) in the body of the shell below a bite plate (e.g., bite plate 557). At 601.2, the process 600 can include filing the compartment with a liquid (e.g., liquid 561) to provide a reservoir. At 601.3, the process 600 sealing the liquid in the compartment with a frangible layer (e.g., frangible seal 563). In embodiments, the frangible layer and the liquid are pre-formed as a capsule.

At 605, the process 600 includes forming thru-holes (e.g., thru-holes 27) in the shell formed at 601. In embodiments, the thru-holes are formed along with the shell by masking portions of the mold when it is cast at 601. Alternatively, the thru-holes can be cut (e.g., drilled) through the shell after being formed at 601. In embodiments, the thru-holes are formed entirely through the outer wall of the shell, which provides a fluid connection between an interior region of the shell and an environment outside the shell.

At 607, a wicking layer (e.g., wicking layer 19 or wicking layer 59) is formed. In embodiments, the wicking layer is formed by vacuum forming or in-mold forming using a highly absorbent material (e.g., a non-woven material). At 609, a filament layer (e.g., filament layer 23 or filament layer 63) is formed. In embodiments, the filament layer is formed by vacuum forming or in-mold forming. In embodiments, the wicking layer and filament layer may be formed and adhered together to form an easily-handled subassembly that is then adhered to the inside of the shell layer. At 613, the wicking layer and the filament layer are attached (adhered or bonded) to the inner surface of the outer wall of the shell, with the wicking layer sandwiched between the inner surface and the filament layer.

FIG. 7 illustrates a flow diagram of a process 700 for using a mouthpiece (e.g., oral care mouthpiece 10) in accordance with embodiments of the present disclosure. As detailed previously herein, the mouthpiece includes a wicking layer (e.g., wicking layer 19) and a filament layer (e.g., filament layer 23) attached to an inner surface (e.g., 1533) of a shell (e.g., shell 15). At 701, a user removes the mouthpiece from a moisture-resistant package. In some embodiments, at 703, the user can hydrate the mouth piece using a water source. For example, the user can hold the mouthpiece under a running faucet or the package can be filled with water after opening and the mouthpiece placed back in to absorb the required fluid.

At 705, the user inserts the mouthpiece in their mouth over his/her upper dental arch and/or lower dental arch. In some embodiments, at 705.1, the user can place first section of the mouthpiece on the upper dental arch and, at 705.2, the user can place a second section of the mouthpiece on the lower dental arch.

At 709, the user conforms the mouthpiece to the facial and interproximal teeth surfaces. As detailed previously herein, heat and/or moisture in the mouth of the user soften the mouthpiece such that it deforms into a shape that conforms to the particular curvature and topographic features of that user's teeth. Additionally or alternatively, the user can apply manual pressure (e.g., using their fingers, mouth cheeks, and or lips) to conform a section of the mouthpiece to the curvature and topographic features of the teeth.

At 713, the user retains the mouthpiece in their mouth for a predetermined period of time (e.g., about 30 minutes). Once the mouthpiece is placed in the user's mouth, the user's normal production of saliva is naturally increased. At 713.1, the saliva it is collected (e.g., wicked-up) and held by the wicking layer. Saliva may also enter the mouthpiece over the walls of the shell to directly contact the filament layer. At 713.2, moisture collected in the wicking layer hydrates the filament layer. At 713.3, the moisture activates the separate components of the oral care chemistry. In embodiments, as moisture is transferred into the filament layer, it transforms into a whitening agent or a desensitization agent (e.g., liquid, a gel, a paste, or the like), which is held in direct contact with the facial surfaces and the interproximal surfaces of the user's teeth by the shell and/or the wicking layer. At 717, after passage of the predetermined amount of time, the user removes the mouthpiece and disposes of it.

FIG. 8 illustrates a flow diagram of a process 800 for using a mouthpiece (e.g., mouthpiece 50) in accordance with embodiments of the present disclosure. As detailed previously herein, the mouthpiece includes a wicking layer (e.g., wicking layer 59) and a filament layer (e.g., filament layer 63) attached to an inner surface of the shell (e.g., shell 55) of the mouthpiece. At 801, a user removes the mouthpiece from the moisture-resistant package. At 805, the user inserts the mouthpiece in their mouth over his/her upper dental arch and/or lower dental arch. As previously described above, at 805.1, the user can place first section of the mouthpiece on the upper dental arch and, at 805.2, the user can place a second section of the mouthpiece on the lower dental arch.

At 809, the user conforms the mouthpiece to the facial and interproximal teeth surfaces, as detailed previously herein. At 813, the user ruptures compartments (e.g., compartments 559) containing a reservoir of liquid (e.g., liquid 561) by biting down on a bite plate (e.g., bite plate 557) of the mouthpiece. As also detailed previously herein, the liquid is initially separated from an interior region of the mouthpiece by frangible seals (e.g., frangible seals 563). The pressure of the user's bite fractures the frangible seals, which releases the liquid into the interior region of the mouthpiece.

At 815.1, the liquid it is collected (e.g., wicked-up) from the interior region of the mouthpiece a wicking layer (e.g., wicking layer 59). Saliva may also enter the mouthpiece over the walls of the shell to directly contact the filament layer. At 815.2, moisture collected in the wicking layer hydrates the filament layer. At 815.3, the moisture activates the separate components of the oral care chemistry. In embodiments, as moisture is transferred into the filament layer, it transforms into a whitening agent or a desensitization agent (e.g., liquid, a gel, a paste, or the like), which is held in direct contact with the facial surfaces and the interproximal surfaces of the user's teeth by the shell and/or the wicking layer. Additionally, in some embodiments, the liquid includes one of the components of the oral care agent. At 817, after passage of the predetermined amount of time in 815, the user removes the mouthpiece and disposes of it.

The above features have been described in detail with particular reference to certain preferred embodiments thereof, but it will be understood that variations and modifications can be effected within the spirit and scope of the disclosure. One of skill in the art will appreciate that each of the above are exemplary implementations and are not to be construed as a limitation on the scope of the present disclosure.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in any ensuing claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An oral care mouthpiece comprising:
    a shell having an arch shape corresponding to one or more dental arches, the shell comprising a wall corresponding to facial surfaces of teeth in the one or more dental arches, and a bite plate corresponding to biting surfaces of the teeth, the wall forming an outermost surface of the oral care mouthpiece;
    a wicking layer on an inner surface of the wall;
    a filament layer on the wicking layer;
    a plurality of thru-holes through the wall that fluidly connect the wicking layer with an outer surface of the shell;
    a reservoir of liquid below the bite plate; and
    a frangible seal containing the liquid in the reservoir, the reservoir being configured so that, upon rupture of the frangible seal, the liquid is forced from the reservoir to the wicking layer.

2. The oral care mouthpiece of claim 1, wherein the wicking layer is sandwiched between the inner surface and the filament layer.

3. The oral care mouthpiece of claim 1, wherein the shell comprises a material that becomes malleable at about body temperature.

4. The oral care mouthpiece of claim 1, wherein the wicking layer comprises a flat layer of absorbent material.

5. The oral care mouthpiece of claim 1, wherein the filament layer comprises a dry film including a plurality of components in an inactive state that, when hydrated, combine into an oral care agent.

6. The oral care mouthpiece of claim 5, wherein the plurality of components in the dry film include an activator that forms the oral care agent by combining with at least two other components of the plurality of components.

7. The oral care mouthpiece of claim 5, wherein the plurality of components in the dry film include an activator that forms the oral care agent by catalyzing a reaction between at least two other components of the plurality of components.

8. A shell having an arch shape corresponding to one or more dental arches, the shell comprising:
    a wall corresponding to facial surfaces of teeth in the one or more dental arches,
    a bite plate corresponding to biting surfaces of the teeth,
    a reservoir of liquid below the bite plate, and
    a frangible seal containing the liquid in the reservoir;
    a wicking layer on an inner surface of the wall;
    a filament layer on the wicking layer; and
    a plurality of thru-holes extending through the wall, wherein the thru-holes fluidly connect the wicking layer with an outermost surface of the oral care mouthpiece,
    wherein the reservoir is configured so that, upon rupture of the frangible seal, the liquid is forced from the reservoir to the wicking layer.

9. The oral care mouthpiece of claim 8, wherein the shell comprises a material that becomes malleable at about body temperature.

10. The oral care mouthpiece of claim 8, the wicking layer comprises a flat layer of highly absorbent material.

11. The oral care mouthpiece of claim 8, wherein the filament layer comprises a dry film comprised of a plurality of components in an inactive state that, when hydrated, combine into an oral care agent.

12. The oral care mouthpiece of claim 11, wherein the plurality of components include an activator that forms the oral care agent by combining with at least two other components of the plurality of components.

13. The oral care mouthpiece of claim 11, wherein the plurality of components include an activator that forms the oral care agent by catalyzing a reaction between at least two other components of the plurality of components.

14. The oral care method of claim 8, wherein the reservoir of liquid comprises a component of an oral care agent.

15. A method for forming an oral care mouthpiece comprising:

forming a shell comprising a wall corresponding to facial surfaces of teeth in a dental arch, and a bite plate corresponding to biting surfaces of the teeth, the wall forming an outermost surface of the oral care mouthpiece;

forming thru-holes through the wall;

forming a wicking layer;

forming a filament layer;

attaching the wicking layer and the filament layer to an inner surface of the wall, wherein the wicking layer is sandwiched between the inner surface and the filament layer;

forming one or more compartments containing respective reservoirs of a liquid below the bite plate; and forming a frangible seal containing the reservoirs of liquid in the one or more compartments, so that, upon rupture of the frangible seal, the liquid is forced from the respective reservoirs to the wicking layer.

* * * * *